United States Patent [19]

Jackson

[11] 4,270,731

[45] Jun. 2, 1981

[54] VALVE WITH NON-BINDING SPOOL

[75] Inventor: George J. Jackson, Peoria, Ill.

[73] Assignee: Caterpillar Tractor Co., Peoria, Ill.

[21] Appl. No.: 34,322

[22] Filed: Apr. 30, 1979

[51] Int. Cl.[3] .......... F16K 11/07

[52] U.S. Cl. .......... 251/309; 251/314; 137/625.22; 137/625.47

[58] Field of Search .......... 137/625.21, 625.22, 137/625.23, 625.24, 625.68, 625.69, 625.47; 251/309, 324, 363, 314, 316

[56] References Cited

U.S. PATENT DOCUMENTS

| | | | |
|---|---|---|---|
| 2,540,467 | 2/1951 | Williams | 251/324 X |
| 3,090,396 | 5/1963 | Rudelick | 137/625.47 X |
| 4,021,016 | 5/1977 | Hart | 137/625.69 X |
| 4,074,614 | 2/1978 | Beals . | |

*Primary Examiner*—Alan Cohan

*Attorney, Agent, or Firm*—Wegner, Stellman, McCord, Wiles & Wood

[57] ABSTRACT

A hydraulic assembly including a valve having a body (40), an elongated chamber (42) having a wall and a conduit (60) in the body, a valve spool (44) movable within the chamber, a drive (48) for the spool, an elongated sleeve (50) within the chamber and spaced from the wall thereof, the sleeve movably receiving the spool in a substantially fluid tight relation and having at least one port (52) for fluid flow with the flow through the port being controlled by the position of the spool within the sleeve, resilient washers (56) spacing the sleeve from the chamber wall and yieldably supporting the sleeve within the chamber, and yieldable fluid connections (64) extending between the port in the sleeve and the conduit in the body so that deflection in the body need not cause deflection of the sleeve so that binding tendencies between the spool and the sleeve are avoided.

4 Claims, 4 Drawing Figures

PRIOR ART

VALVE WITH NON-BINDING SPOOL

DESCRIPTION

1. Technical Field

This invention relates to a hydraulic assembly including a spool valve with provision for preventing binding of the spool.

2. Background Art

Prior art of possible relevance includes the following U.S. Pat. Nos. 2,929,362 issued Mar. 22, 1960 to Hayner; 3,012,576 issued Dec. 12, 1961 to Williams; 3,951,166 issued Apr. 20, 1976 to Whitener; and 4,074,614 issued Feb. 21, 1978 to Beals.

Many hydraulic applications utilize hydraulic assemblies including spool valves, both rotary and reciprocating. Typically, the assembly will include an elongated bore or the like which either reciprocally or rotatably receives an elongated spool. In order to prevent leakage in the system, quite close tolerances are employed and where the valve body is not subjected to any appreciable degree of external force, the use of such close tolerances effectively minimizes leakage and yet allows free movement of the spool.

However, in some instances, the hydraulic assembly or valve body housing the spool may be subject to external forces which cause minute deflections of the valve body. When such occurs, because of the typical elongated nature of a spool and the close tolerances employed, binding between the spool and the wall of the bore receiving the same which interferes with free movement of the spool will occur, whether the spool is intended for reciprocal or rotatable movement.

In the previously identified Beals patent, there is illustrated a structure where such binding can readily occur. Specifically, Beals ilustrates a dual radial piston motor having a rotary spool valve within the center of the motor. The motor is employed in, for example, hydraulically driven, crawler type vehicles for driving the tracks thereof. Consequently, the motor will typically be located in the track frame of such a vehicle and as the vehicle travels over uneven terrain in the typical environment in which such vehicles are utilized, no matter how sturdily built, some deflection is encountered in the motor housing which, of course, distorts the valve receiving bore. This in turn could lead to binding between the spool and the housing because of the close tolerances employed to prevent hydraulic leakage.

And while Beals deals with a structure utilizing a rotary spool, those skilled in the art will recognize that there are many instances wherein the same type of problem can be encountered where the spool is mounted for reciprocating movement, rather than rotary movement.

DISCLOSURE OF THE INVENTION

The present invention is directed to overcoming one or more of the problems as set forth above.

According to the present invention, there is provided a hydraulic assembly including a valve. The assembly includes a body provided with an elongated chamber having a wall and a conduit therein. A valve spool is movable within the chamber and means are provided for moving the spool within the chamber. An elongated sleeve is disposed within the chamber and is spaced from the wall thereof. The sleeve movably receives the spool in substantially fluid tight relation and has at least one port for fluid flow with the flow through the port being controlled by the position of the spool within the sleeve. According to the invention there are provided resilient means spacing the sleeve from the wall of the body and yieldably supporting the sleeve within the chamber. Yieldable means establish fluid communication between the port in the sleeve and the conduit in the body.

Consequently, deflection in the body need not cause deflection of the sleeve by reason of the resilient and yieldable mounting of the latter within the former. As a result, binding tendencies between the spool and the sleeve due to deflection of the body are avoided.

Other objects and advantages will become apparent from the following specification taken in connection with the accompanying drawings.

BEST MODE FOR CARRYING OUT THE INVENTION

Figure 1:
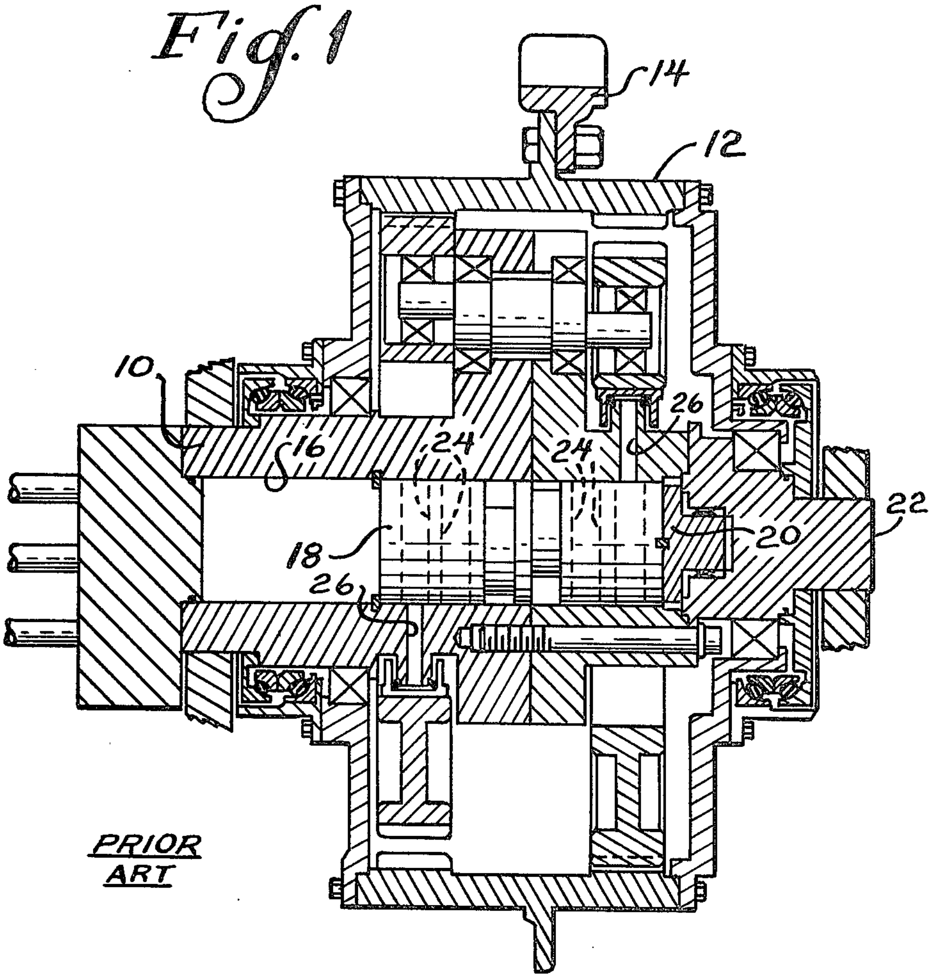
FIG. 1 is a sectional view of a hydraulic assembly made according to the prior art, namely, that disclosed by Beals in his previously identified United States patent.

A typical hydraulic assembly in which the invention may be employed with efficacy is illustrated in FIG. 1 in the form of a so-called dual radial piston motor such as that disclosed in the previously identified U.S. patent to Beals, the details of which are herein incorporated by reference. In the interest of brevity, the structure illustrated in FIG. 1 will be described only insofar as is necessary to gain an understanding of the present invention, the precise structure and mode of operation being readily as certainable from the Beals United States patent.

The hydraulic assembly includes a fixed body 10 and a rotary body 12 journalled thereon. The exterior of the rotary body 12, when used for the purpose intended by Beals, mounts a sprocket 14 which in turn may be engaged with a crawler type track (not shown) for driving the same on a vehicle track frame.

The fixed body 10 includes an elongated bore 16 which rotatably receives a valve spool 18. The valve spool 18 is driven by a gear 20 which inparts a rotating force from means not shown to the spool 18.

The spool 18 includes a plurality of ports 24 which are alignable periodically with conduits 26 in the fixed body 10. A variety of pistons and cylinders, orbiting members, etc., are contained within the movable housing 12 and oriented with respect to the conduits 26 such that fluid under pressure directed to the conduits 26 by the port 24 in the spool 18 inpart a rotating force to the movable housing 12 in the manner described by Beals.

Extremely close tolerances are employed in constructing the spool 18 and the bore 16 in which it is received so as to minimize leakage within the assembly. To the extent that such leakage would occur, it would represent a loss of energy inparted to a hydraulic pump providing hydraulic fluid under pressure to the valve 18 which could not be converted by the assembly into a drive power. Thus, as close tolerances as are economically feasible are employed.

However, as alluded to previously, the very nature of the assembly is such that it will be subjected to sizable external forces which can cause deflection of the various components. And when the fixed housing 10 deflects even minutely, because of the close tolerances employed, the resulting distortion of the bore 16 will tend to cause the rotating spool 18 to bind therein thereby impeding proper operation of its hydraulic fluid distributing function. In some instances, this can interfere with proper operation of the device or damage components and in any event, the resulting binding between relatively movable components accelerates wear and shortens the useful life of the assembly.

Figure 3:
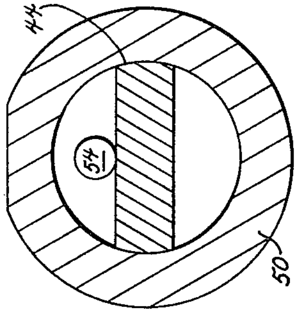
FIG. 3 is a sectional view taken approximately along the line 3—3 in FIG. 2.
Figure 4:
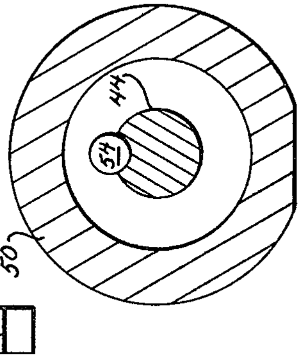
FIG. 4 is a fragmentary, sectional view taken approximately along the line 4—4 in FIG. 2.
Figure 2:
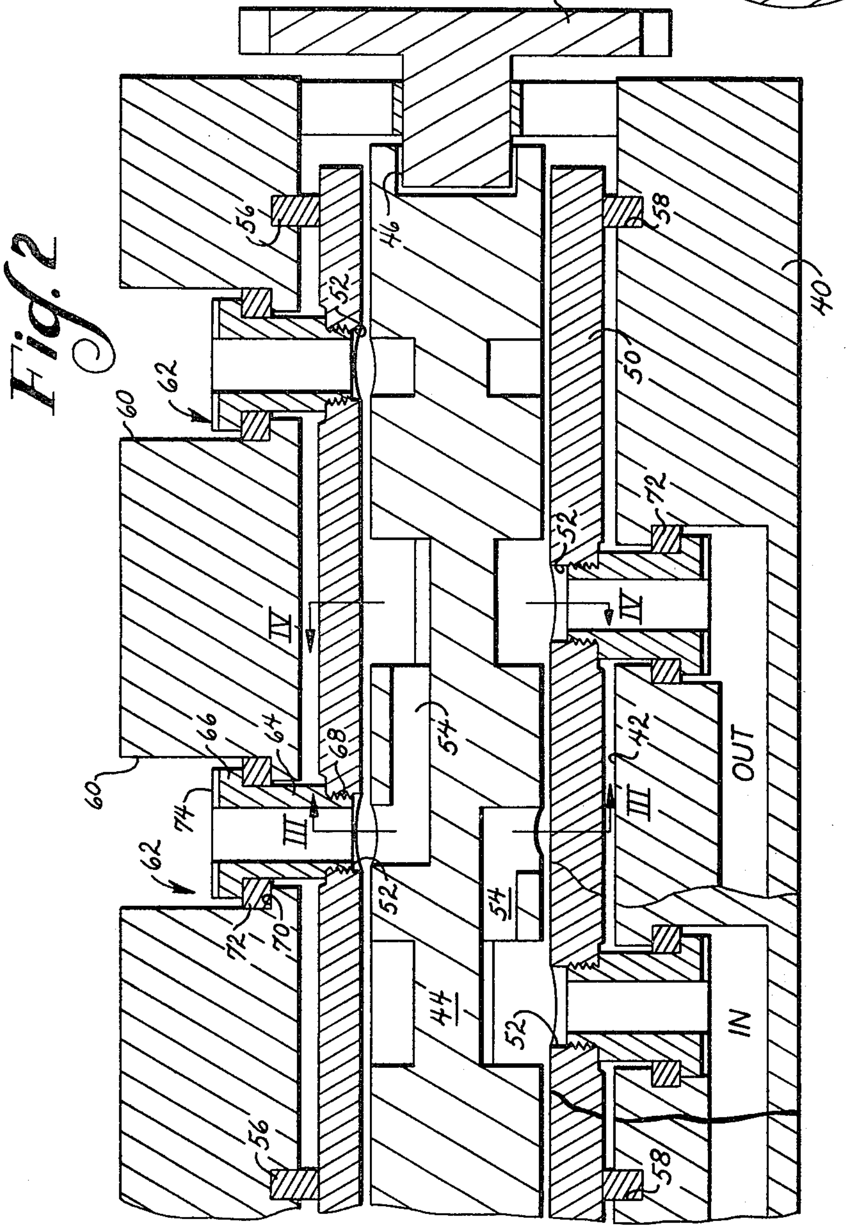
FIG. 2 is an enlarged, fragmentary, sectional view of a valving assembly made according to an embodiment of the present invention that may be utilized in, for example, a hydraulic assembly illustrated in FIG. 1.

Turning now to FIGS. 2-4, an embodiment of the present invention will be described. As seen in FIG. 2, there is provided a housing 40 which may correspond to the fixed housing 10 illustrated in FIG. 1. The housing 40 is provided with an elongated chamber 42, roughly akin to the bore 16 illustrated in FIG. 1. A rotating valve spool 44 is received within the chamber 42 and can be rotated via a flexible coupling 46 by a drive gear 48. The drive gear 48 is driven by any suitable means known in the art.

An elongated sleeve 50 is disposed within the chamber 42 and movably, that is, rotatably, receives the spool 44. The sleeve 50 includes a plurality of ports 52 through which hydraulic fluid may flow dependant upon the angular position of the spool 44 and passages 54 therein, within the sleeve 50. Of course, the spool 44 is fitted to the interior of the sleeve 50 with extremely close tolerances to avoid leakage and the attendant energy waste.

The precise configuration of the passages 54 and the ports 52 and their relative location with respect to each other form no part of the present invention, such orientation being governed by the type of apparatus in which the invention is employed.

As is readily apparent from FIG. 2, the radially outer surface of the sleeve 50 is spaced from the wall of the chamber 42 and completely out of contact therewith. Such spacing is provided by resilient means in the form of elastomeric washers 56 adjacent opposite ends of the sleeve 50. For locating purposes, the washers 56 have their radially outer extremeties received in annular, radially inwardly opening grooves 58 in the walls of the chamber 42. The housing or body 40 includes one or more conduits 60 corresponding approximately to the conduits 26 illustrated in FIG. 1. These conduits 60 are in fluid communication with corresponding ones of the ports 52 in the sleeve 50 via yieldable means, generally designated 62. Each of the yieldable means 62 comprises a short section of pipe 64 or the like having a radially outwardly directed flange 66 at one end and an opposite threaded end 68. The threaded ends 68 of the pipes 64 are threadably received in corresponding ones of the ports 52 in the sleeve 50 and the threads are sealed with a suitable sealant.

Each of the conduits 60, includes an annular shoulder 70 which faces the flanged end 66 and which is located between the ends 66 and 68. An elastomeric seal 72 is located between the shoulder 70 and the flanged end 68 and sealingly engages the two.

It will also be noted that each of the pipe section 64 is completely out of contact with the body 40 but is sealed thereto by the seal 72. For installation purposes, flanged end 66, on the side thereof remote from the threaded end 68, may include a diametrical slot 74 for receipt of a screw driver or the like.

Industrial Applicability

When the invention is employed in a hydraulic assembly such as that illustrated in FIG. 1, its operation will be generally as described in the Beals U.S. patent. Should external forces be applied to the assembly causing deflection of the body 40, such deflection, while it may cause small distortions of the chamber 42, will not cause a distortion of the sleeve 50 which could lead to binding of the spool 44 therein. This is due to the presence of the elastomeric washers 56 which space the sleeve 50 from the walls of the chamber 42 and yieldably support the same. Consequently, apart from the extremely small forces involved in compressing one or the other or both of the resilient washers 56, the sleeve 50 floats about the spool 44 and therefore will not bind thereto. And, of course, by reason of the flexible coupling 46, the spool 44 is permitted to skew somewhat with respect to the rotational axis of its drive, the gear 48.

Should such deflection of the body 40 occur with resultant skewing of both the spool 44 and the sleeve 50 within the chamber 42, fluid communication is maintained by reason of the use of the yieldable couplings provided by the pipe sections 64. And since the same do not rigidly contact any part of the body 44, they are free to shift somewhat within their respective conduits 60 without transmitting deflecting forces from the body 40 to the sleeve 50.

Installation of the pipe sections 64 is readily facilitated by their configuration as described as well as by the provision of the tool receiving slots 74 therein. At the same time, sealing pressure caused by compression of the seal 72 can be suitably regulated by the depth to which the threaded ends 68 of the pipe section 64 are caused to enter the ports 52 in the sleeve 50.

In addition to avoiding deflection which can lead to binding, the invention provides an additional advantage over constructions heretofore known such as that described by Beals and illustrated in FIG. 1. As the inevitable wear of the sleeve 50 occurs to the point where leakage becomes undesirably high, in contrast to discarding the entire cast sections of the fixed housing 10 shown in FIG. 1, only the sleeve 50 of the present invention need be replaced. The sleeve, of course, can be fabricated at considerably less expense than the housing sections and thus a considerable economy results from this feature of the invention.

I claim:

1. In a hydraulic assembly including a valve, the combination of:

a body (40);

an elongated chamber (42) having a wall and a conduit (60) in said body;

a valve spool (44) movable within said chamber;

means (48) for moving said spool within said chamber;

an elongated sleeve (60) within said chamber and spaced from the wall thereof, said sleeve movably receiving said spool in substantially fluid tight relation and having at least one port (52) for fluid flow with flow through the port being controlled by the position of the spool within said sleeve;

resilient means (56) spacing said sleeve from said wall and yieldably supporting said sleeve within said chamber;

yieldable means (62,64,66,68,70,72) establishing fluid communication between said port in said sleeve and said conduit in said body;

said yieldable means including a pipe (64), flanged at one end (66), connected at its other end (68) to said port and having said flanged end extending into said conduit in spaced relation to the sides thereof, said conduit having an annular shoulder (70) facing but spaced from, said flanged end and disposed intermediate the ends of said pipe; and a resilient seal (72) disposed between and sealingly engaging said flanged end and said shoulder;

whereby deflection in said body need not cause deflection in said sleeve whereby binding tendencies between said spool and said sleeve are avoided.

2. The hydraulic assembly of claim 1 wherein said pipe other end is threaded (68) into said sleeve about said port and said flanged end includes a tool receiving formation (74) for rotating said pipe.

3. In a hydraulic assembly including a valve, the combination of:

a body;

an elongated chamber having a wall and a conduit in said body;

a valve spool rotatable within said chamber;

means for rotating said spool within said chamber;

an elongated sleeve within said chamber and spaced from the wall thereof, said sleeve movably receiving said spool in substantially fluid tight relation and having at least one port for fluid flow with flow through the port being controlled by the position of the spool within said sleeve; and resilient and yeildable means spacing said sleeve from said wall and yieldably supporting said sleeve within said chamber and establishing fluid communication between said port in said sleeve and said conduit in said body, said resilient and yieldable means including a pipe, flanged at one end, connected at its other end to said port and having said flanged end extending into said conduit in spaced relation to the sides thereof, said conduit having an annular shoulder facing but spaced from said flanged end and disposed intermediate the ends of said pipe, and a resilient seal disposed between and sealingly engaging said flanged end and said shoulder;

whereby deflection in said body need not cause deflection in said sleeve so that binding tendencies between said spool and said sleeve are avoided.

4. In a hydraulic assembly including a valve, the combination of:

a body;

an elongated chamber having a wall and a conduit in said body;

a valve spool rotatable within said chamber;

means for rotating said spool within said chamber;

an elongated sleeve within said chamber and spaced from the wall thereof, said sleeve movably receiving said spool in substantially fluid tight relation and having at least one port for fluid flow with flow through the port being controlled by the position of the spool within said sleeve; and resilient and yieldable means spacing said sleeve from said wall and yieldably supporting said sleeve within said chamber and establishing fluid communication between said port in said sleeve and said conduit in said body, said yieldable means including an annular shoulder in one of said port and said conduit, a pipe fixedly secured to the other of said port and said conduit and having a flanged end, and a resilient seal disposed between and sealingly engaging said flanged end and said shoulder;

whereby deflection in said body need not cause deflection in said sleeve whereby binding tendencies between said spool and said sleeve are avoided.

* * * * *